2,856,305

CELLULOSE ESTER PLASTICS IN ATTENUATED FORM CONTAINING POLY-(4-ACETYL-BETA-RESORCYLIC ACID) AS AN ULTRAVIOLET INHIBITOR

Donald J. Shields, Charles J. Kibler, and Roger M. Schulken, Jr., Kingsport, Tenn., assignors to Eastman Kodak Company, Rochester, N. Y., a corporation of New Jersey No Drawing. Application February 18, 1957
Serial No. 640,579

5 Claims. (Cl. 106—180)

This invention concerns improvements in weathering resistance of cellulose ester plastics, particularly in the form of very thin sections such as in films or fibers.

In formulations of cellulose ester plastics intended for outdoor use, it is customary to incorporate a small percentage of a stabilizer like phenyl salicylate. This material has the ability first, to absorb, and then, to dispose harmlessly of the otherwise damaging ultraviolet radiation present in sunlight. In relatively thick pieces of the plastic, such as one-eighth inch, 1% of phenyl salicylate does an efficient job of retarding weathering breakdown. However, in thin sheets, .001–.010 inch thick, this stabilizer escapes too fast from the plastic, by evaporation or leaching or both. A similar, but larger and less migratory type of stabilizer molecule, poly-4-acetyl-$\beta$-resorcylic acid, was accordingly synthesized and found to be more effective for the stabilization of films and fibers. Like phenyl salicylate it is colorless in the plastic and does not discolor on exposure. Moreover, like most polymers it consists of a mixture of chains of various lengths. The shortest chains, principally the monomer, migrate relatively easily through the plastic so as to continually replace the stabilizer lost, during weathering, from the surface by processes of leaching, evaporation, or destruction by ultraviolet radiation. The longer chains migrate with difficulty, or not at all, through the plastic, remaining in the body of the plastic to confer stability over relatively long periods of exposure. This compound thus constitutes a good compromise between a small-molecule, migratory stabilizer, which protects the surface well for a short time, and a large-molecule, non-migratory stabilizer, which protects the interior for a long time but allows the surface of the plastic to disintegrate rapidly.

PREPARATION AND PROPERTIES OF POLY-4-ACETYL-$\beta$-RESORCYLIC ACID

Seventy-five grams of 4-acetyl-$\beta$-resorcylic acid (Lesser and Gad, Ber., 59B, 233–6 (1926)) was thoroughly ground in a mortar with 1.5 g. of zinc chloride. This mixture was placed in a 500-cc. Erlenmeyer flask and heated in a metal bath maintained at 130–135° C. The internal temperature of the mixture gradually rose to 118–120° during 20 minutes, at which point it began to melt. About five minutes were required to melt the mass completely whence acetic acid vapors distilled. The mixture was heated 15 minutes longer at 120–126°. Manual stirring was employed throughout the operation. The mixture was then cooled to 50–60° C. and dissolved in 190 ml. acetone. The acetone solution was filtered into 1500 ml. of vigorously stirred cold water which precipitated the product as an easily filterable powder. The yield of dried product was 39–42 g. The product is a mixture of poly-(4-(acetyl)-$\beta$-resorcylic acid) of average molecular weight of 300–450 and has a melting range of 120–220° C.

EXAMPLE 1

The shortcomings of phenyl salicylate have been illustrated by the following experiment: Five samples of cellulose acetate-butyrate plastic, each containing 100 parts of cellulose acetate-butyrate containing approximately 12% acetyl and 37% butyryl, 12 parts of dibutyl sebacate, and 1 part of phenyl salicylate and ranging in thickness from 0.025 in. to 0.125 in. in steps of 0.025 in., were exposed outdoors for 20 months in Arizona. The top 0.025 in. layer was then milled off each of these samples and measured for molecular-weight breakdown. Table I shows how the internal reservoir of stabilizer in the thicker pieces kept the surface layer supplied and stabilized by diffusion during exposure. The thinner pieces, having no reservoir to draw on, rapidly became brittle when the stabilizer left the surface layer.

*Table I*

| Sample Thickness (in.) | Brittleness of Sample | Percent Molecular-Weight Breakdown in Top 0.025 in. Layer |
|---|---|---|
| 0.125 | very slight | 20 |
| 0.100 | slight | 30 |
| 0.075 | considerable | 46 |
| 0.050 | extreme | 85 |
| 0.025 | extreme | 70 |

EXAMPLE 2

Cellulose acetate-butyrate plastic, of the same composition as that of Example 1, was pressed to a film .008 inch thick and exposed at 140° F. in a Twin-Arc Atlas Weather-Ometer, modified by the addition of eight 20-watt Westinghouse fluorescent sun lamps. A similar modification of the Weather-Ometer was described in detail in a paper by J. W. Tamblyn and G. M. Armstrong, entitled "A Modification of the Atlas Twin-Arc Weather-Ometer," in Analytical Chemistry 25, 460–5 (1953). Brittleness developed after 350 hours. A similar film, containing 1 part of poly-4-acetyl-$\beta$-resorcylic acid, required 500 hours' exposure to develop an equal degree of brittleness.

EXAMPLE 3

Even in .050 inch sheets of the same compositions as the films of Example 2, the polymeric inhibitor gave 35% longer protection against embrittlement in the modified Weather-Ometer.

EXAMPLE 4

A .050 inch sheet of composition similar to that of the second film of Example 2, except that the stabilizer consisted of 0.5 part of phenyl salicylate mixed with 0.5 part of the polymeric inhibitor, showed a 33% improvement in accelerated weathering resistance over the sheet stabilized with one part of phenyl salicylate only.

EXAMPLE 5

Cellulose acetate yarns, wet-spun from dimethylformamide dope with and without 1% of the poly-4-acetyl-$\beta$-resorcylic acid, showed a large difference in rate of deterioration in the modified Weather-Ometer. The untreated yarn, after 890 hours' exposure, lost 35% in strength and 75% in extensibility while the stabilized yarn lost only 20% in strength and was unchanged in extensibility.

EXAMPLE 6

Three samples of yarn similar to those of Example 5, except that they were dry-spun in conventional acetate spinning equipment, were exposed outdoors for 2 summer months. At the end of this time the regular, unstabilized yarn had lost over 60% of its initial strength and over 90% of its initial stretch. The stabilized yarn had lost only 40% and 55% respectively of its initial strength and stretch. After 3 months the stabilized yarn still retained 63% and 14% of its initial strength and stretch, respectively, while the unstabilized yarn had suffered practically complete loss of properties, being too weak and brittle for measurement. The third sample, which contained 1% of phenyl salicylate as a stabilizer, had lost 53% of its initial strength and 87% of its initial stretch after 2 summer months' exposure. After 3 months this yarn was too weak and brittle for measurement of its properties.

Example 7

A plastic composition consisting of 100 parts cellulose acetate butyrate containing approximately 12% acetyl and 37% butyryl and 12 parts of dibutyl sebacate was stabilized by the addition in one case, of 1 part of salol, and in the second case, of 1 part of poly-4-acetyl-$\beta$-resorcylic acid [mol. wt. 560]. Sheets .050 inch thick were exposed to the accelerated weathering conditions of Example 2 except that four additional fluorescent sun lamps were used and the temperature was lowered to 120° F. The time required for embrittlement of the salol-stabilized sheet was 1400 hours while the sheet stabilized with the polymeric stabilizer was still not brittle after an exposure of over 2000 hours.

Example 8

LOSS OF ELONGATION IN TENITE BUTYRATE FILMS ON EXPOSURE

Films .010 inch thick exposed in modified Weather-Ometer:

| Stabilizer | Initial Elongation [percent] | Percent Elongation Retained After Exposure of— | | |
|---|---|---|---|---|
| | | 95 hr. | 165 hr. | 448 hr. |
| None | 40 | 90 | 21 | 0 |
| 1 pt. salol | 48 | | 52 | 0 |
| 1 pt. poly-4-acetyl-$\beta$-resorcylic acid [mol. wt. ca. 400] | 45 | | 96 | 58 |
| 1 pt. poly-4-acetyl-$\beta$-resorcylic acid (mol. wt. ca. 560) | 47 | | 51 | 43 |
| 1 pt. monomeric $\beta$-resorcylic acid | 95 | | 83 | 17 |

Light-stabilized thin films of cellulose esters are useful for plant covers, packaging, melt coatings, poultry house windows, safety glazing for preventing explosion damage, winter glazing, and the like.

Light-stabilized cellulose ester yarns make better drapes and awning fabrics.

What we claim as our invention and desire to be secured by Letters Patent of the United States is:

1. A cellulose organic acid ester plastic composition in attenuated form, comprising a cellulose organic acid ester selected from the group consisting of cellulose acetate and cellulose acetate-butyrate and, as an agent for inhibiting deterioration of the plastic by ultraviolet light, approximately 1%, based on the weight of the cellulose ester, of poly-(4-acetyl-beta-resorcylic acid).

2. A cellulose organic acid ester plastic composition in attenuated form, comprising a cellulose organic acid ester selected from the group consisting of cellulose acetate and cellulose acetate-butyrate, a plasticizer therefor, and, as an agent for inhibiting deterioration of the plastic by ultraviolet light, approximately 1%, based on the weight of the cellulose ester, of poly-(4-acetyl-beta-resorcylic acid).

3. A cellulose organic acid ester plastic composition in the form of a film of thickness not greater than 0.010 inch, comprising a cellulose organic acid ester selected from the group consisting of cellulose acetate and cellulose acetate-butyrate and, as an agent for inhibiting deterioration of the plastic by ultraviolet light, approximately 1%, based on the weight of the cellulose ester, of poly-(4-acetyl-beta-resorcylic acid).

4. A cellulose organic acid ester plastic composition in the form of a filament, comprising a cellulose organic acid ester selected from the group consisting of cellulose acetate and cellulose acetate-butyrate and, as an agent for inhibiting deterioration of the plastic by ultraviolet light, approximately 1%, based on the weight of the cellulose ester, of poly-(4-acetyl-beta-resorcylic acid).

5. A cellulose organic acid ester plastic composition in attenuated form, comprising a cellulose organic acid ester selected from the group consisting of cellulose acetate and cellulose acetate-butyrate and, as an agent for inhibiting deterioration of the plastic by ultraviolet light, approximately 1%, based on the weight of the cellulose ester, of a polymer formed by heating 4-acetyl-beta-resorcylic acid with a catalytic amount of zinc chloride.

References Cited in the file of this patent

UNITED STATES PATENTS

| | | |
|---|---|---|
| 2,432,517 | Dreyfus | Dec. 16, 1947 |
| 2,454,950 | Simpson et al. | Nov. 30, 1948 |
| 2,568,894 | Mackey | Sept. 25, 1951 |